United States Patent
Safarik et al.

(10) Patent No.: US 6,302,077 B1
(45) Date of Patent: Oct. 16, 2001

(54) MOTORCYCLE BALANCER SYSTEM (75) Inventors: David A. Safarik, Muskego; Bernard F. Enright, Brookfield; R. Bruce Dennert, Mukwonago; Bernardus G. H. Vandenhoeven, Waukesha; Paul Troxler, Brookfield, all of WI (US)

(73) Assignee: Harley-Davidson Motor Company, Milwaukee, WI (US)

( * ) Notice: Subject to any disclaimer, the term of this patent is extended or adjusted under 35 U.S.C. 154(b) by 0 days.

(21) Appl. No.: 09/364,193

(22) Filed: Jul. 30, 1999

(51) Int. Cl.[7] .................................................. F16F 15/10
(52) U.S. Cl. ........................................................ 123/192.2
(58) Field of Search ........................................... 123/192.2

(56) References Cited

U.S. PATENT DOCUMENTS

| | | |
|---|---|---|
| 1,898,459 | 2/1933 | Newcomb . |
| 3,402,707 | 9/1968 | Heron ................... 123/192 |
| 3,800,625 * | 4/1974 | Seino et al. ................... 123/192.2 |
| 3,830,212 | 8/1974 | Seino et al. ................... 123/192 |
| 4,000,666 | 1/1977 | Ito et al. ................... 74/604 |
| 4,028,963 | 6/1977 | Nakamura et al. ................... 74/604 |
| 4,414,934 | 11/1983 | Vogl et al. ................... 123/192 |
| 4,508,069 | 4/1985 | Dobler et al. ................... 123/192 |
| 4,523,553 | 6/1985 | Backlund ................... 123/192 |
| 4,538,481 * | 9/1985 | Ohta et al. ................... 123/192.2 |
| 4,648,359 | 3/1987 | Ito ................... 123/90.31 |
| 4,683,849 | 8/1987 | Brown ................... 123/192 |
| 4,690,111 | 9/1987 | Kohno et al. ................... 123/192 |
| 4,696,267 | 9/1987 | Kohno et al. ................... 123/192 |
| 4,703,724 | 11/1987 | Candea et al. ................... 123/192 |
| 4,703,725 | 11/1987 | Weertman ................... 123/192 |
| 4,766,857 | 8/1988 | Laine et al. ................... 123/192 |
| 4,802,450 | 2/1989 | Roberts ................... 123/192 |
| 4,856,486 | 8/1989 | Mori et al. ................... 123/572 |
| 5,044,333 | 9/1991 | Fuchigami et al. ................... 123/192 |
| 5,218,885 | 6/1993 | Nakano et al. ................... 74/591 |
| 5,305,656 | 4/1994 | Kamiya et al. ................... 74/604 |
| 6,047,667 * | 4/2000 | Leppanen et al. ................... 123/196 R |

FOREIGN PATENT DOCUMENTS 2 100 800    1/1983   (GB) .

* cited by examiner

Primary Examiner—Henry C. Yuen
Assistant Examiner—Hyder Ali
(74) Attorney, Agent, or Firm—Michael Best & Friedrich LLP

(57) ABSTRACT

A motorcycle engine includes a crankshaft rotating in response to the reciprocation of pistons in cylinder bores. The inertial effects of the reciprocating pistons cause vibrations in the engine. A pair of balancer shafts are provided on opposite sides of the crankshaft, and are driven by the crankshaft through a drive member, such as a chain or belt. The balancer shafts are supported for rotation by bearings in the left side of the engine's crankcase, and by bearings in bearing housings that are mounted to the left side of the engine's crankcase. Thus, the balancer shafts are substantially only supported for rotation by the left side of the crankcase.

16 Claims, 8 Drawing Sheets

MOTORCYCLE BALANCER SYSTEM

FIELD OF THE INVENTION

The invention relates to balancer systems for motorcycle engines.

BACKGROUND

Piston reciprocation in internal combustion engines often causes the engine to vibrate. More specifically, the motion of an engine's pistons within their respective cylinder bores causes vibrations because the pistons' movement is started and stopped twice during each rotation of the engine's crankshaft. The inertial effects of each piston cause primary vibrations along the axis of that piston.

One known method of damping or offsetting primary vibrations is to mount one or more counterweights to the crankshaft. The counterweights are most effective when they are spaced radially from the crankshaft axis of rotation, with the crankshaft axis of rotation intermediate the crankpin and the counterweights. Although the counterweights orbit about the crankshaft axis of rotation in a generally circular path, the counterweights move generally opposite the direction of travel of the linearly-reciprocating pistons.

While it is possible to offset most or all primary vibrations of the piston with such counterweights, movement of the counterweights causes further vibrations that may not be aligned with the primary vibrations. Thus, as the mass of the counterweights is increased to further offset the primary vibrations of the pistons, the moving counterweights create higher-order vibrations.

The vibration environment becomes even more complex in a V-twin, single-crankpin engine. In that type of engine, the pistons are interconnected with the same crankpin, and are oriented at a 45° angle with respect to each other. Therefore, the pistons do not start and complete their respective strokes in unison. The resultant combined primary vibration acts generally vertically and transverse to the crankshaft axis of rotation.

It is known to provide one or more balancer shafts in combination with crankshaft-mounted counterweights to substantially offset primary vibrations. One known configuration includes a pair of balancer shafts disposed on opposite sides of the crankshaft, and rotating in timed sequence with the crankshaft.

Typically, no balancing system is perfect, and there will often exist higher order vibrations that cannot practically be dampened. Such vibrations may resonate in the engine's crankcase and be amplified by the same.

SUMMARY

The present invention provides a motorcycle including a crankcase having a left side and a right side mounted on a motorcycle frame, a crankshaft, and a balancer shaft mounted for rotation within the crankcase and supported substantially by only one of the sides of the crankcase. Because the balancer shaft is supported substantially by only one of the sides of the crankcase, vibrations are substantially isolated from the other side of the crankcase, and there is believed to be less amplification and noise.

The balancer shaft is driven by a drive member, such as a gear, belt, or chain, that interconnects the balancer shaft with the crankshaft. Sprockets or gears may be mounted on the balancer shaft and crankshaft to transfer force from the crankshaft to the drive member, and from the drive member to the balancer shaft. The balancer shaft thus rotates in response to rotation of the crankshaft.

Preferably, the motorcycle includes two balancer shafts that are disposed on opposite sides of the crankshaft. One end of each balancer shaft can be supported by a bearing in a first side of the crankcase, and the other end can be supported by a bearing in a bearing housing that is also mounted to the first side of the crankcase. Preferably, the bearing housings are joined together with a guide bracket. The guide bracket provides a substantially rigid connection between the bearing housings that permits the free ends of the bearing housings to oscillate in unison. The guide bracket also provides at least one tensioner (e.g., a hydraulic tensioner) for the drive member.

In one embodiment, the engine also includes a flywheel that includes a counterweight portion. In a V-twin single-crankpin engine, two flywheels may be mounted on opposite sides of the connecting rods, with the ends of the crankpin supported by the respective flywheels. The flywheel is configured to cooperate with the balancer shafts to more effectively offset piston-induced vibrations.

The invention also includes an interconnect seal providing fluid communication between an oil passage extending through one side of the crankcase and a hydraulic passage in the guide bracket. An oil pump provides pressurized oil to the hydraulic tensioner through the interconnect seal. The interconnect seal includes a central portion that is thicker than the opposite end portions. In this regard, the interconnect seal initially yields relatively easily as the sides of the crankcase are brought together, and then increasingly resists being compressed as the sides come together. Compression tends to drive the sealing edges out radially. The interconnect seal is therefore believed to permit a quality seal between the side of the crankcase and the guide bracket without causing the guide bracket to unacceptably deflect. The interconnect seal also allows for some misalignment and motion between the sides of the crankcase and the guide bracket.

Other features and advantages of the invention will become apparent to those skilled in the art upon review of the following detailed description, claims, and drawings.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify steps of a method or process is simply for identification and is not meant to indicate that the steps should be performed in a particular order.

DETAILED DESCRIPTION

Figure 1:
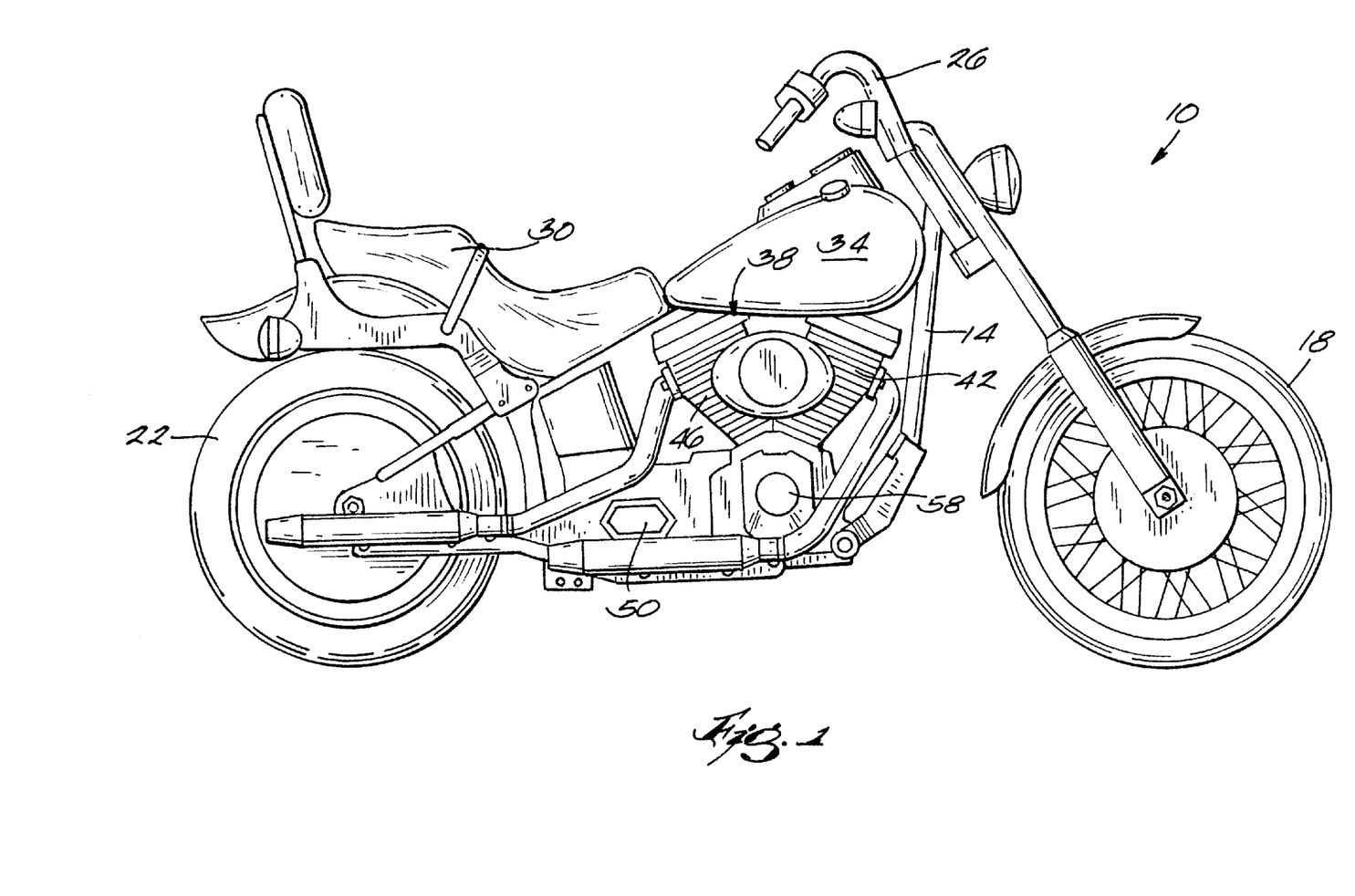
FIG. 1 is a right side elevational view of a motorcycle embodying the present invention.
Figure 2:
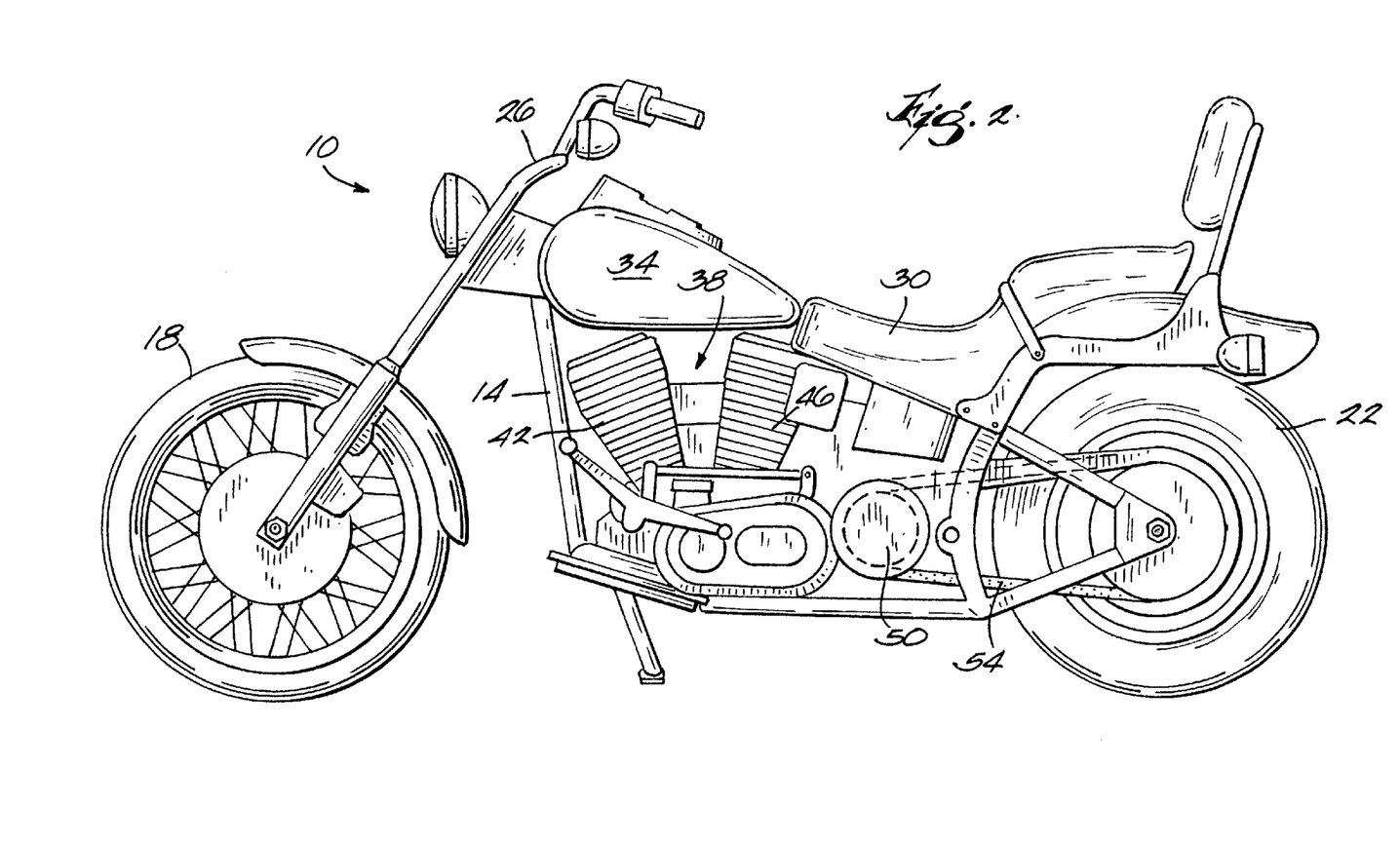
FIG. 2 is a left side elevational view of the motorcycle of FIG. 1.

FIGS. 1 and 2 illustrate a motorcycle 10 embodying the present invention. The motorcycle 10 includes a frame 14. Interconnected with the frame 14 are front and rear wheels 18, 22, a steering assembly 26 for the front wheel 18, a seat 30, and a gas tank 34. The motorcycle 10 also includes an engine 38 having front and rear cylinders 42, 46, and a transmission 50 driving the rear wheel 22 through a belt or chain 54. The illustrated engine 38 is a V-twin single-crankpin engine, but the invention may be used with substantially any type of engine having one or more cylinders.

Figure 3:
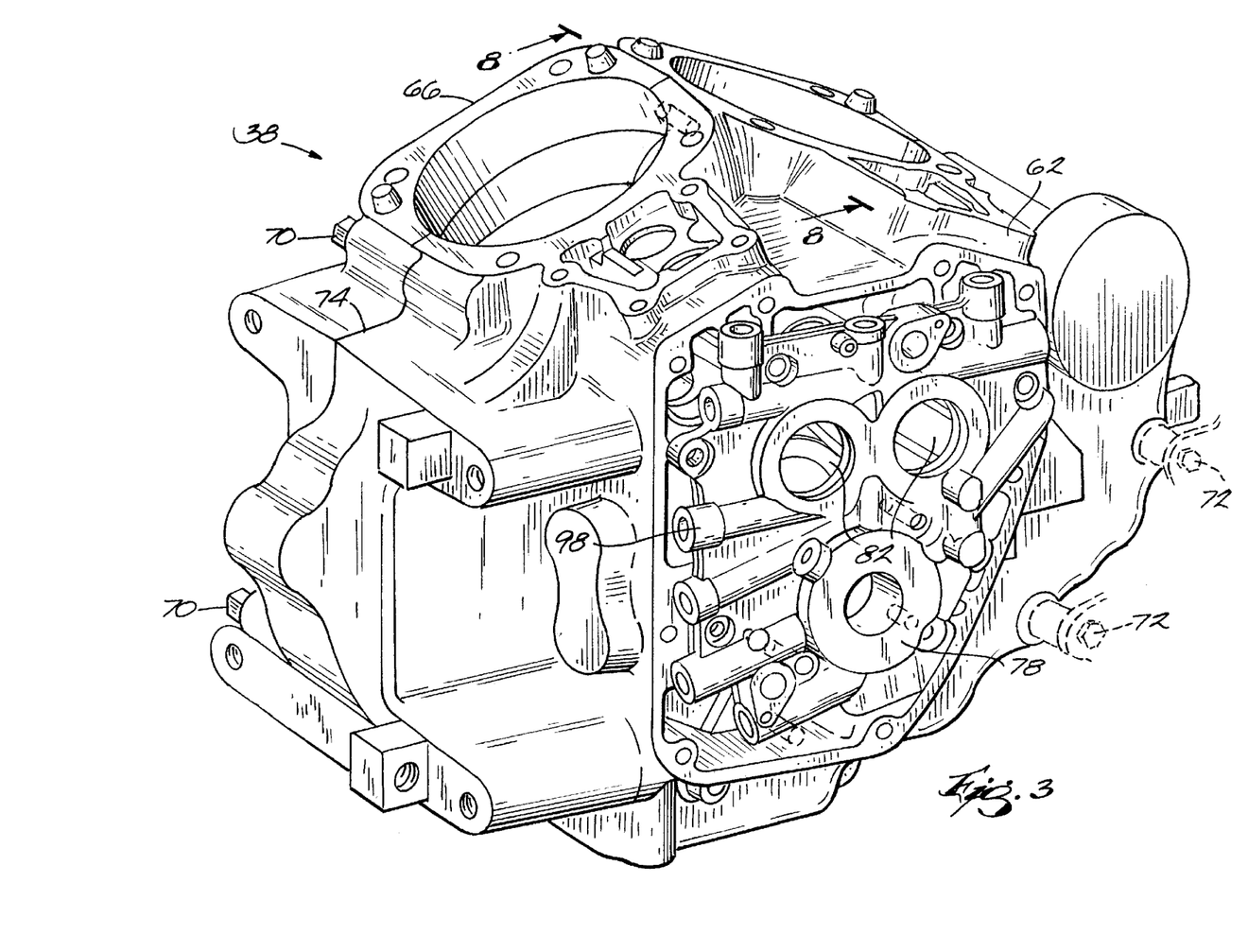
FIG. 3 is a perspective view of the right side of the engine crankcase with a cover removed.

FIG. 3 illustrates the engine 38 with a cam cover 58 (FIG. 1) and the front and rear cylinders 42, 46 removed. The engine 38 includes a crankcase having a right side 62 and a left side 66 joined together with fasteners 70 along a split line 74. Additional bolts 72 may be used to further hold the sides 62, 66 together and to provide convenient mounting points to the frame 14.

Figure 4:
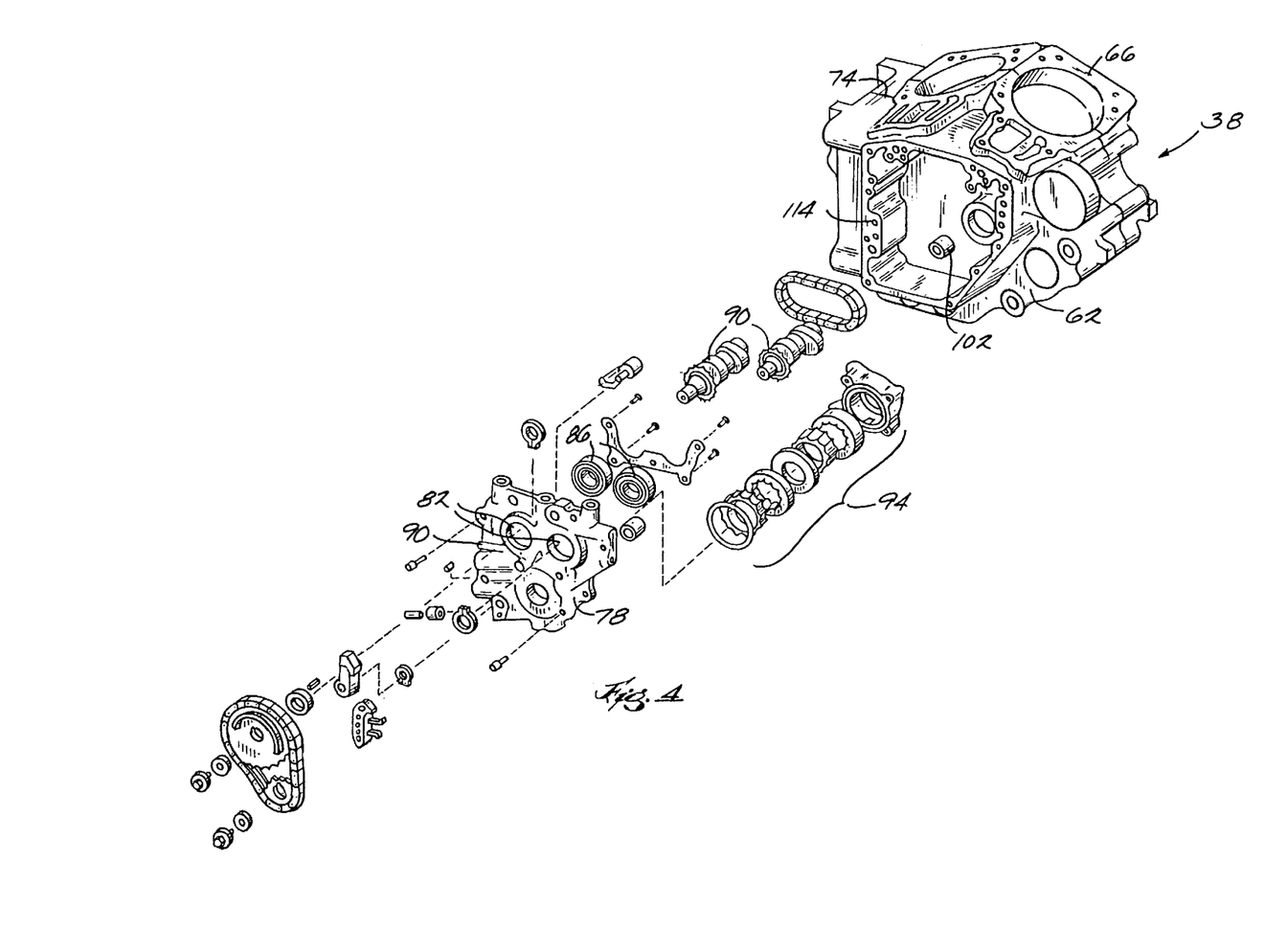
FIG. 4 is an exploded view of the right side of the engine.

With additional reference to FIG. 4, a cam shaft support plate 78 is mounted within the right side 62 of the crankcase. The cam shaft support plate 78 includes apertures 82 that contain bearings 86 that support the right ends of cam shafts 90 for rotation. The cam shaft support plate 78 also includes a plurality of oil passages for the flow of pressurized oil from an oil pump 94. One oil passage 98 is of particular relevance to the balancing system described below.

Figure 5:
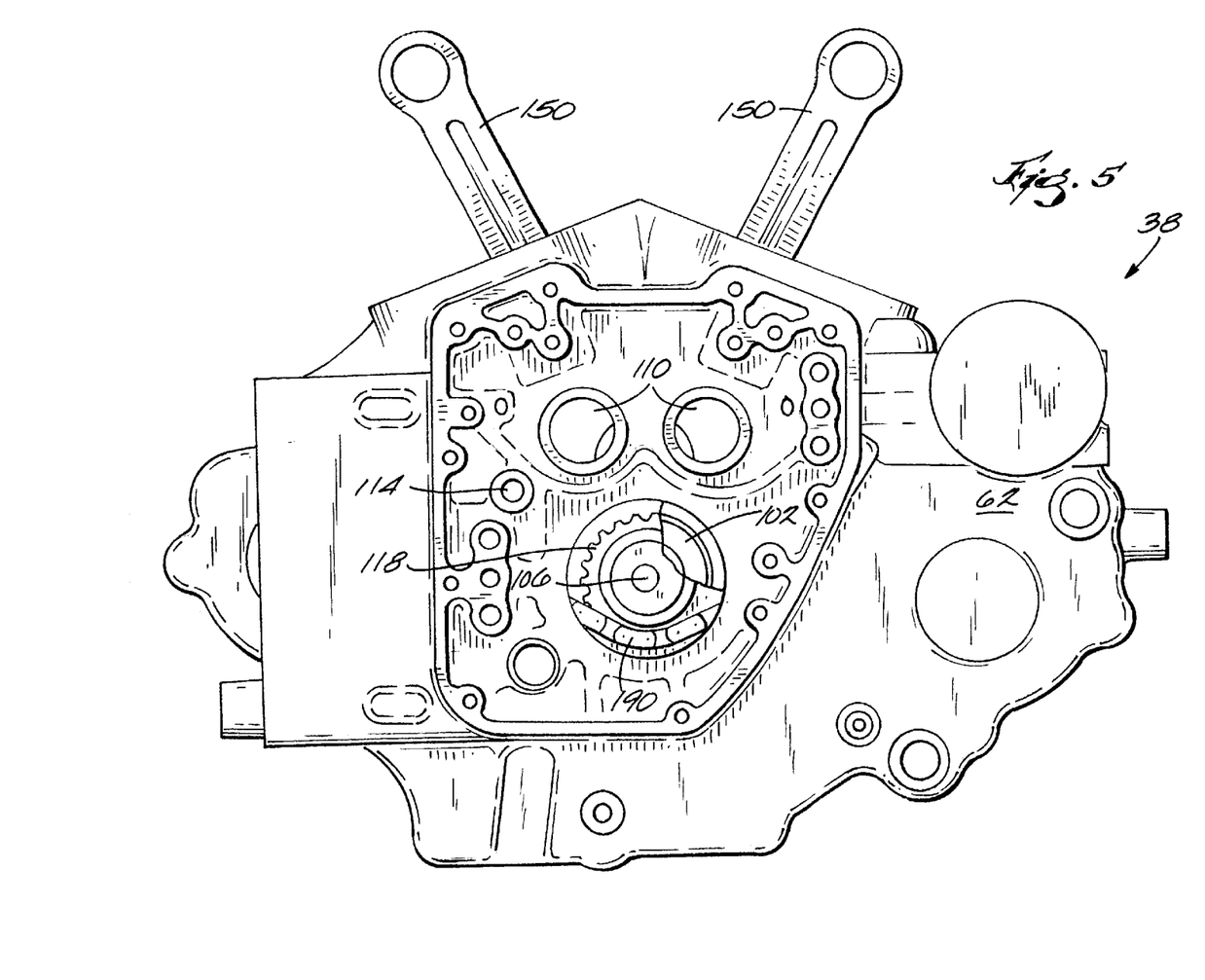
FIG. 5 is a right side elevational view of the engine crankcase with the cam shaft support plate and cam shafts removed.

FIGS. 4 and 5 illustrate a right side view of the engine 38 with the cam shaft support plate 78 removed. The right side 62 of the crankcase houses a main bearing 102 (partially shown in FIG. 5) for supporting the right side of the engine's crankshaft 106 for rotation. Apertures 110 in the right side 62 of the crankcase also house bearings (not shown) for supporting the left ends of the cam shafts 90 for rotation. The right side 62 of the crankcase also defines an oil conduit 114 that is in communication with the cam shaft support plate oil passage 98 when the support plate 78 is properly installed. A sprocket 118 is press-fit onto the crankshaft 106. The purpose of the press-fit connection is described further below.

Figure 6:
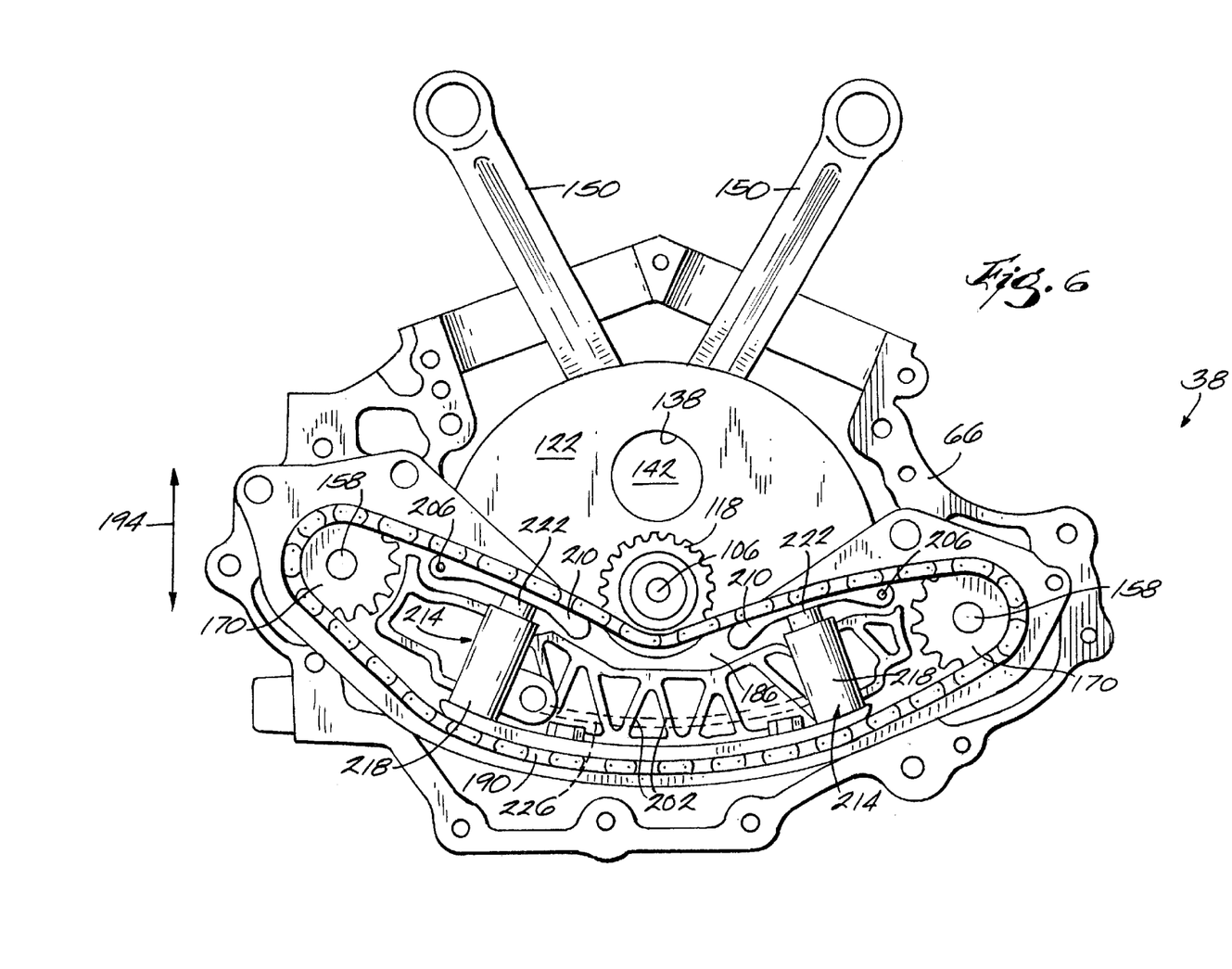
FIG. 6 is a right side elevational view of the engine crankcase with the right side of the engine crankcase removed.
Figure 7:
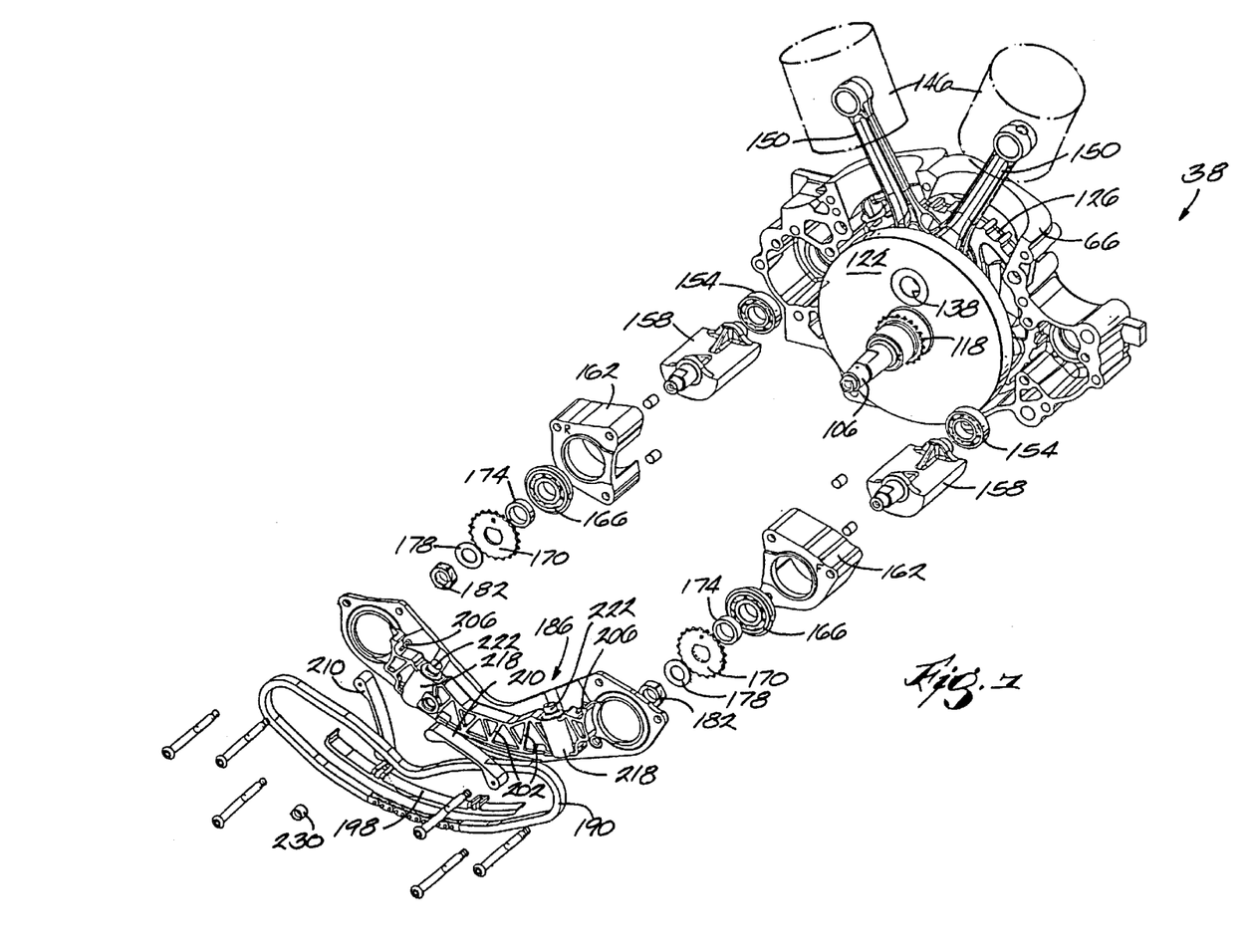
FIG. 7 is an exploded view of the left side of the engine crankcase.
Figures 8, 9:
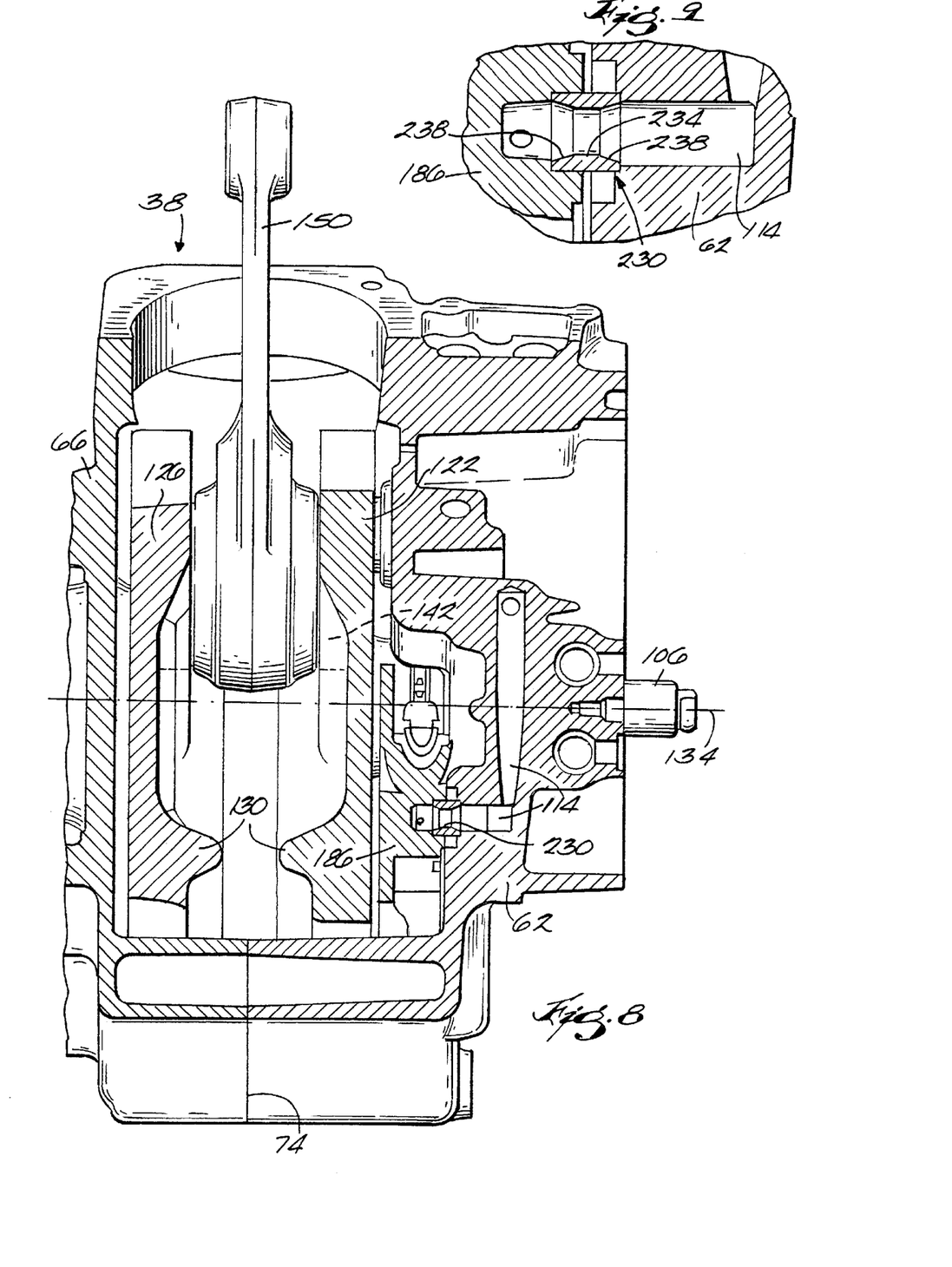
FIG. 8 is a cross-section view taken along line 8—8 in FIG. 3.
FIG. 9 is an enlarged view of a portion of FIG. 8.

Referring now to FIGS. 6–8, the crankshaft 106 includes right and left ends, each including a flywheel 122, 126. The flywheels 122, 126 are preferably integrally-formed with the respective ends of the crankshaft 106. The left flywheel 126 includes peripheral teeth that engage a chain or belt (not shown) interconnecting the crankshaft 106 with the transmission 50. The flywheels 122, 126 have counterweight portions 130 (FIG. 8) disposed eccentrically with respect to an axis of rotation 134 of the crankshaft 106. The flywheels 122, 126 may be used as oil slingers or splashers to distribute oil within the crankcase. Each flywheel 122, 126 also includes a bore 138 for a crankpin 142 that couples the flywheels 122, 126. The crankpin 142 interconnects the pistons 146 (shown in phantom in FIG. 7) to the crankshaft 106 through a pair of connecting rods 150. Alternatively, more than one crankpin 142 may be used. The crankpin 142 is mounted to the flywheels 122, 126 such that the axis of rotation 134 of the crankshaft 106 is disposed substantially between the crankpin 142 and the counterweight portions 130.

With specific reference to FIG. 7, the left side 66 of the crankcase also houses a pair of bearings 154 that support the left ends of a pair of balancer shafts 158 for rotation in the crankcase. Preferably, the balancer shafts 158 provide about half the balancing force to offset the primary vibrations, and the counterweight portions 130 provide the other half. As seen in FIG. 6, the rear balancer shaft 158 is positioned vertically higher than the front balancer shaft 158. The crankshaft 106 is positioned substantially between the two balancer shafts 158.

Returning to FIG. 7, bearing housings 162 are mounted to the left side 66 of the crankcase with dowel pins or other suitable fasteners, and house bearings 166 to support the right ends of the balancer shafts 158. In this regard, the balancer shafts 158 are supported substantially only by the left side 66 of the crankcase. Mounting the balancer shafts 158 substantially only to the left side 66 of the crankcase is believed to reduce noise caused by vibrations. It is believed that the right side 62 of the crankcase acts as a vibration and noise amplifier, and that at least some of the noise can be reduced or eliminated by not directly mounting the balancer shafts 158 to the right side 62 of the crankcase. Alternatively, the balancer shafts 158 could be substantially only supported by the right side 62 of the crankcase.

The balancer shafts 158 are eccentrically weighted, and include flats onto which sprockets 170 are mounted for rotation with the balancer shafts 158. Spacers 174 are interposed between the bearings 166 and the sprockets 170, washers 178 are positioned on the other side of the sprockets 170, and nuts 182 are threaded onto the ends of the balancer shafts 158 to secure the assembly together.

A guide bracket 186 is fastened only to the free ends of the bearing housings 162, and substantially rigidly couples the bearing housings 162. A drive member 190, such as a chain or belt, couples the crankshaft sprocket 118 to the balancer shaft sprockets 170. As the crankshaft 106 rotates, the drive member 190 causes the balancer shafts 158 to rotate in timed sequence such that the counterweight portions 130 and balancer shafts 158 substantially offset primary vibrations caused by the reciprocating pistons 146. The direction of primary vibration in the illustrated engine 38 is indicated by arrows 194 in FIG. 6. The drive member 190 is lubricated by the oil splashed by the flywheels 122, 126. A lower guide 198 is snap-fit into the guide bracket 186, or fastened to the guide bracket 186 in any other suitable manner, and serves to guide the lower portion of the drive member 190.

Should one or both of the balancer shafts 158 become jammed so that it does not rotate, the drive member 190 will resist rotation of the crankshaft sprocket 118. When the force on the crankshaft sprocket 118 reaches a threshold level, the crankshaft sprocket 118 will overcome its press-fit connection and permit the crankshaft 106 to rotate with respect to the crankshaft sprocket 118. In this regard, the press-fit interconnection between the crankshaft 106 and the crankshaft sprocket 118 reduces the effects of a sudden seizure of one or both of the balancer shafts 158.

As the balancer shafts 158 rotate, they may cause the free ends of the bearing housings 162 to vibrate or oscillate back and forth. The guide bracket 186 couples the free ends of the bearing housings 162 and permits them to oscillate in unison. This is believed to provide better support for both bearing housings 162. The guide bracket 186 also includes ribs 202 (FIG. 6). The orientation, size, and position of the ribs 202 permit the guide bracket 186 to be "tuned" so that the guide bracket 186 does not vibrate or resonate at the operating frequencies of the engine 38. The guide bracket 186 is preferably die cast.

Mounted on the guide bracket 186 are pivot pins 206 that receive an end of a respective tensioner arm 210. The tensioner arms 210 are constructed of wear-resistant material. A pair of hydraulic tensioners 214 (FIG. 6) are also mounted on the guide bracket 186. The hydraulic tensioners 214 include a cylinder 218 and a piston or plunger 222. The tensioners 214 may be provided by Borg-Warner Automotive, of Chicago, Ill. The tensioners 214 include a spring (not shown) to bias the plungers 222 outwardly against the tensioner arms 210 at low r.p.m. or before the oil pump 94 delivers pressurized oil to the tensioners 214. At higher r.p.m. situations, the tensioners act in response to pressurized oil in the cylinders 218. The heads of the plungers 222 each include an aperture for purging air from the cylinders 218, and for permitting small amounts of oil to pass out of the cylinders 218 to lubricate the sliding engagement of the tensioner arms 210 and the plungers 222.

The tensioners 214 are in fluid communication with each other through a hydraulic passage 226 (FIG. 6). The hydraulic passage 226 is in communication the oil conduit 114 in the right side 62 of the crankcase through an interconnect seal 230 (FIG. 9). The thickness of the interconnect seal wall ramps down from a relatively thick middle portion 234 to relatively thin outer end portions 238. The relatively thin end portions 238 permit easy initial deflection of the interconnect seal 230 under axial pressure. The end portions 238 deflect radially outwardly under compression.

The pressurized oil path from the oil pump 94 to the tensioners 214 thus includes the cam shaft support plate oil passage 98, the oil conduit 114 in the right side 62 of the crankcase, the interconnect seal 230, and the hydraulic passage 226. The interconnect seal 230 provides a flexible bridge for the pressurized oil from the right side 62 of the crankcase to the guide bracket 186. Because the interconnect seal 230 initially yields relatively easily as it is compressed between the right side 62 of the crankcase and the guide bracket 186, the guide bracket 186 may remain substantially flat and unbowed or undeflected. If the guide bracket 186 were to bow too much, it may interfere with the operation of the right flywheel 122. The interconnect seal 230 also provides good sealing despite the guide bracket's 186 motion and the stack-up of tolerances which determine the gap thickness. Additionally, the interconnect seal 230 may be reliably installed between the right side 62 of the crankcase and the guide bracket 186 substantially without concern for alignment in a substantially blind assembly process.

It should be noted that the invention may be modified such that the bearing housings 162 for the balancer shafts 158 are substantially only supported by the right side 62 instead of the left side 66. Such an arrangement may be favorable for a right side drive engine and transmission.

What is claimed is:

1. A motorcycle comprising:
   a frame;
   a crankcase interconnected with said frame and including a left side and a right side;
   a crankshaft mounted for rotation within said crankcase;
   a balancer shaft mounted for rotation within said crankcase and supported substantially only by one of said sides;
   a drive member interconnecting said balancer shaft with said crankshaft to cause rotation of said balancer shaft;
   a bearing mounted within one of said sides, said bearing supporting one end of said balancer shaft for rotation; and
   a bearing housing mounted to said one of said sides, and including a bearing for supporting the opposite end of said balancer shaft for rotation.

2. The motorcycle of claim 1, wherein said balancer shaft is supported substantially only by said left side.

3. The motorcycle of claim 1, wherein said balancer shaft includes first and second balancer shafts, and wherein said crankshaft is disposed between said balancer shafts.

4. The motorcycle of claim 1, further comprising a flywheel, wherein said balancer shaft provides approximately half the balancing force, and said flywheel provides approximately half the balancing force.

5. The motorcycle of claim 1, wherein said opposite end of said balancer shaft is supported substantially only by said bearing in said bearing housing.

6. A motorcycle comprising:
   a frame;
   a crankcase interconnected with said frame and including a left side and a right side;
   a crankshaft mounted for rotation within said crankcase;
   a balancer shaft mounted for rotation within said crankcase and supported substantially only by one of said sides;
   a drive member interconnecting said balancer shaft with said crankshaft to cause rotation of said balancer shaft; and
   a sprocket press-fit onto said crankshaft and engaging said drive member to transfer rotation of said crankshaft into motion of said drive member, wherein said press-fit interconnection permits said crankshaft to rotate with respect to said sprocket in response to a predetermined force applied to said sprocket.

7. A motorcycle comprising:
   a frame;
   a crankcase interconnected with said frame and including a left side and a right side;
   a crankshaft mounted for rotation within said crankcase;
   a balancer shaft mounted for rotation within said crankcase and supported substantially only by one of said sides;
   a drive member interconnecting said balancer shaft with said crankshaft to cause rotation of said balancer shaft;
   a bearing housing mounted to said one of said sides;
   a bearing disposed at least partially within said bearing housing, and at least partially supporting said balancer shaft for rotation;
   a drive member guide mounted to said bearing housing;
   a hydraulic tensioner mounted on said drive member guide;
   an oil pump providing pressurized oil;
   an oil conduit at least partially defined by the other side of said crankcase; and
   an interconnect seal having a wall and including opposite end portions and a center portion between said end portions, the thickness of said wall being greater in said center portion than in said end portions;
   wherein said interconnect seal is in fluid communication between said oil conduit and said hydraulic tensioner, wherein said oil pump provides pressurized oil to said tensioner through said oil conduit and interconnect seal, and wherein said tensioner provides tension to said drive member in response to the presence of pressurized oil.

8. The motorcycle of claim 7, wherein said end portions of said interconnect seal displace radially outward under a longitudinal compressive force.

9. A motorcycle comprising:

a frame;

a crankcase interconnected with said frame and including a left side and a right side;

a crankshaft mounted for rotation within said crankcase;

first and second balancer shafts mounted for rotation within said crankcase and supported substantially only by one of said sides;

a drive member interconnecting said balancer shafts with said crankshaft to cause rotation of said balancer shafts;

first and second bearing housings at least partially supporting said first and second balancer shafts, respectively, and mounted in cantilever fashion to said one of said sides; and a joining member extending between and mounted only to each of said bearing housings, and substantially rigidly connecting the ends of each of said bearing housings to each other to permit said ends of said bearing housings to oscillate substantially in unison.

10. The motorcycle of claim 9, wherein said balancer shafts are supported substantially only by said left side.

11. The motorcycle of claim 9, wherein said crankshaft is disposed between said balancer shafts.

12. The motorcycle of claim 9, further comprising a flywheel, wherein said balancer shafts provide approximately half the balancing force, and said flywheel provides approximately half the balancing force.

13. The motorcycle of claim 9, further comprising a sprocket press-fit onto said crankshaft and engaging said drive member to transfer rotation of said crankshaft into motion of said drive member, wherein said press-fit interconnection permits said crankshaft to rotate with respect to said sprocket in response to a predetermined force applied to said sprocket through said drive member.

14. The motorcycle of claim 9, further comprising:

a drive member guide mounted only to said first and second bearing housings;

first and second hydraulic tensioners mounted on said drive member guide, and in communication with each other through a hydraulic passage;

an oil pump providing pressurized oil;

an oil conduit at least partially defined by the other side of said crankcase; and an interconnect seal having a wall and including opposite end portions and a center portion between said end portions, the thickness of said wall being greater in said center portion than in said end portions;

wherein said interconnect seal is in fluid communication between said oil conduit and said hydraulic passage, wherein said oil pump provides the pressurized oil to said tensioners through said oil conduit, interconnect seal, and hydraulic passage, and wherein said tensioners provide tension to said drive member in response to the presence of the pressurized oil.

15. A motorcycle comprising:

a frame;

a crankcase interconnected with said frame and including a left side and a right side;

a crankshaft mounted for rotation within said crankcase;

a balancer shaft mounted for rotation within said crankcase and supported substantially only by one of said sides; and a drive member interconnecting said balancer shaft with said crankshaft to cause rotation of said balancer shaft;

a tensioner acting on said drive member, said tensioner providing tension on said drive member in response to pressure in a lubricant;

an oil pump providing pressurized oil;

at least one cam shaft; and a cam shaft support plate distinct from said right and left sides of said crankcase, at least partially supporting said cam shaft for rotation, and including at least one oil passage in communication between said oil pump and said tensioner to provide pressurized oil to said tensioner.

16. The motorcycle of claim 15, further comprising an interconnect seal providing fluid communication between said oil passage and said tensioner, said interconnect seal including opposite end portions and a center portion between said end portions, said center portion including a wall that is thicker than a wall of said end portions.

* * * * *